United States Patent
Hunt-Schroeder (10) Patent No.: US 11,928,248 B1
(45) Date of Patent: Mar. 12, 2024

(54) SEMICONDUCTOR DEVICE WITH MECHANISM TO PREVENT REVERSE ENGINEERING

(71) Applicant: Marvell Asia Pte Ltd, Singapore (SG)

(72) Inventor: Eric Hunt-Schroeder, Essex Junction, VT (US)

(73) Assignee: Marvell Asia Pte Ltd, Singapore (SG)

( * ) Notice: Subject to any disclaimer, the term of this patent is extended or adjusted under 35 U.S.C. 154(b) by 92 days.

(21) Appl. No.: 17/845,606

(22) Filed: Jun. 21, 2022

Related U.S. Application Data (60) Provisional application No. 63/212,494, filed on Jun. 18, 2021.

(51) Int. Cl.
*G06F 21/71* (2013.01)
*G06F 21/14* (2013.01)

(52) U.S. Cl.
CPC .............. *G06F 21/71* (2013.01); *G06F 21/14* (2013.01)

(58) Field of Classification Search
CPC ................................ G06F 21/71; G06F 21/14
See application file for complete search history.

(56) References Cited

U.S. PATENT DOCUMENTS

| | | | |
|---|---|---|---|
| 9,075,674 B2* | 7/2015 | Tkacik | G06F 7/58 |
| 9,335,971 B1* | 5/2016 | Rouleau | G06F 7/582 |
| 9,411,919 B2* | 8/2016 | Huang | G06F 30/33 |
| 9,564,210 B2* | 2/2017 | Narayanan | G11C 29/50004 |
| 9,640,247 B2* | 5/2017 | Chen | G06F 7/588 |
| 9,780,948 B1* | 10/2017 | Gutoski | H04L 9/0662 |
| 9,846,568 B2* | 12/2017 | Hamilton | G06F 7/588 |
| 10,217,521 B2* | 2/2019 | Omid-Zohoor | H10B 20/20 |
| 10,446,562 B1* | 10/2019 | Horch | G11C 7/12 |
| 11,095,461 B2* | 8/2021 | Plusquellic | G06F 21/44 |
| 11,153,283 B2* | 10/2021 | Graber | H04L 9/0631 |
| 11,321,459 B2* | 5/2022 | Shen | G06F 21/556 |
| 2020/0143901 A1* | 5/2020 | Chhabra | G11C 29/50 |

* cited by examiner

*Primary Examiner* — Viral S Lakhia (57) ABSTRACT

A semiconductor device is configured to implement a security protocol. The semiconductor device includes an entropy source that includes a plurality of bitcells. The entropy source is configured to output a sequence of physical unclonable function bit values based on intrinsic properties of the plurality of bitcells to generate a unique device secret for the security protocol, and selectively damage at least a portion of the plurality of bitcells to prevent reverse engineering the sequence of physical unclonable function bit values.

22 Claims, 7 Drawing Sheets

SEMICONDUCTOR DEVICE WITH MECHANISM TO PREVENT REVERSE ENGINEERING

CROSS REFERENCE TO RELATED APPLICATION

This disclosure claims the benefit of commonly-assigned U.S. Provisional Patent Application No. 63/212,494, filed Jun. 18, 2021, which is hereby incorporated by reference herein in its entirety.

FIELD OF USE

This disclosure relates to securing semiconductor devices having an entropy source. More particularly, this disclosure relates to preventing reverse engineering of physical unclonable function bit values outputted from the entropy source.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Many semiconductor devices use cryptographically secure keys for device security. In accordance with accepted industry and government standards, such as those promulgated in the United States by the National Institute of Standards and Technology (NIST), such a key (sometimes referred to as a "unique device secret" or "UDS") should be random (i.e., impossible or nearly impossible to predict, also referred to as "unclonable"), unique (i.e., different on every device), and stable (i.e., should never change on any one device notwithstanding changes in process conditions, voltage, temperature, age, etc.).

A semiconductor device may implement a security protocol that uses the unique device secret. One technique for generating the unique device secret uses an entropy source and the physical unclonable function bit values outputted from the entropy source. The physical unclonable function bit values are simply outputted from the entropy source without first storing, programming, or writing the physical unclonable function bit values in the entropy source.

SUMMARY

According to a first implementation of the subject matter of this disclosure, a semiconductor device is configured to implement a security protocol. The semiconductor device includes an entropy source that includes a plurality of bitcells. The entropy source is configured to: (i) output a sequence of physical unclonable function bit values based on intrinsic properties of the plurality of bitcells to generate a unique device secret for the security protocol, and (ii) selectively damage at least a portion of the plurality of bitcells to prevent reverse engineering the sequence of physical unclonable function bit values.

In the semiconductor device of the first implementation, the plurality of bitcells are arranged in a plurality of bitline columns and in a plurality of wordline rows. Each of the plurality of wordline rows includes a switch operable to select from a plurality of voltages to apply to respective bitcells of the respective wordline row. The plurality of voltages includes a damage-inducing voltage that is higher than an operating voltage of the respective bitcells.

In the semiconductor device of the first implementation, the switch is operable to select the damage-inducing voltage in response to an initiate damage signal.

In the semiconductor device of the first implementation, the damage-inducing voltage is applied to gate terminals of two or more respective bitcells to induce time delayed dielectric breakdown between the gate terminals and other terminals of the two or more respective bitcells to create a conductive path for a leakage current in the two or more respective bitcells to cause the two or more respective bitcells to be in a damaged state.

In the semiconductor device of the first implementation, the damage-inducing voltage is applied to a subset of the plurality of wordline rows in response to the initiate damage signal.

In the semiconductor device of the first implementation, the damage-inducing voltage is applied to the plurality of wordline rows in parallel in response to the initiate damage signal.

The semiconductor device of the first implementation is one of a processor, a system on a chip, or a semiconductor memory.

According to a second implementation of the subject matter of this disclosure, a semiconductor device is configured to implement a security protocol. The semiconductor device includes an entropy source that includes a plurality of bitcells. The entropy source is configured to: (i) output a sequence of physical unclonable function bit values based on intrinsic properties of the plurality of bitcells to generate a unique device secret for the security protocol, and (ii) selectively damage at least a portion of a bitcell read functionality to alter the intrinsic properties of at least a portion of the bitcells to prevent reverse engineering the sequence of physical unclonable function bit values.

In the semiconductor device of the second implementation, the plurality of bitcells are arranged in a plurality of bitline columns and in a plurality of wordline rows. Each of the plurality of bitline columns includes a bitline, a bitline complement, first damage-inducing circuitry coupled to the bitline, second damage-inducing circuitry coupled to the bitline complement, sense amplifier circuitry, and respective bitcells. Each of the first damage-inducing circuitry and the second damage-inducing circuitry includes a first transistor and a second transistor arranged in series, a first switch operable to select from a plurality of voltages to apply to a gate terminal of the first transistor, and a second switch operable to select from the plurality of voltages to apply to a gate terminal of the second transistor. A terminal of the second transistor is coupled to one of the bitline or the bitline complement. The plurality of voltages includes a damage-inducing voltage that is higher than an operating voltage of the second transistor.

In the semiconductor device of the second implementation, the first and second switches are operable to select the damage-inducing voltage in response to an initiate damage signal.

In the semiconductor device of the second implementation, the damage-inducing voltage is applied in response to the initiate damage signal to induce time delayed dielectric breakdown between the gate terminal of the second transistor and the terminal of the second transistor to create a conductive path for a leakage current in the second transistor to cause the second transistor to be in a damaged state. The conductive path for the leakage current damages a respective bitcell read functionality of the respective bitline column by preventing the sense amplifier circuitry to read the respective bitcells of the respective bitline column and by altering the intrinsic properties of the respective bitcells.

In the semiconductor device of the second implementation, before the damage-inducing voltage is applied in the respective bitline column, the bitline and the bitline complement of the respective bitline column are discharged by enabling respective wordline rows coupled to the respective bitcells of the respective bitline column.

In the semiconductor device of the second implementation, the damage-inducing voltage is applied to one of the first damage-inducing circuitry or the second damage-inducing circuitry in response to the initiate damage signal.

In the semiconductor device of the second implementation, the damage-inducing voltage is applied to both the first damage-inducing circuitry and the second damage-inducing circuitry in response to the initiate damage signal.

The semiconductor device of the second implementation is one of a processor, a system on a chip, or a semiconductor memory.

According to a third implementation of the subject matter of this disclosure, a method of preventing a reverse engineering of a sequence of physical unclonable function bit values outputted from an entropy source based on intrinsic properties of a plurality of bitcells in a semiconductor device configured to implement a security protocol that uses a unique device secret generated from the sequence of physical unclonable function bit values, includes (i) configuring the entropy source to receive a damage-inducing voltage that is higher than an operating voltage of the entropy source and (ii) selectively applying the damage-inducing voltage to damage one of at least a portion of the plurality of bitcells or at least a portion of a bitcell read functionality to alter the intrinsic properties of at least a subset of the plurality of bitcells.

In the method of the third implementation, selectively applying the damage-inducing voltage includes selectively applying the damage-inducing voltage in response to an initiate damage signal. The semiconductor device is one of a processor, a system on a chip, or a semiconductor memory.

In the method of the third implementation, selectively applying the damage-inducing voltage includes inducing time delayed dielectric breakdown to create a conductive path for a leakage current in the portion of bitcells to cause the portion of bitcells to be in a damaged state.

In the method of the third implementation, selectively applying the damage-inducing voltage includes applying the damage-inducing voltage to a subset of a plurality of wordline rows of the entropy source in response to the initiate damage signal.

In the method of the third implementation, selectively applying the damage-inducing voltage includes applying the damage-inducing voltage to a plurality of wordline rows of the entropy source in parallel in response to the initiate damage signal.

In the method of the third implementation, selectively applying the damage-inducing voltage includes inducing, in response to the initiate damage signal, time delayed dielectric breakdown in a damage-inducing circuitry of a bitline column of the entropy source to create a conductive path for a leakage current that damages the bitcell read functionality of the bitline column by preventing sense amplifier circuitry of the bitline column to read the subset of bitcells and by altering the intrinsic properties of the subset of bitcells.

In the method of the third implementation, selectively applying the damage-inducing voltage includes, before the damage-inducing voltage is applied in the bitline column, discharging a bitline and a bitline complement of the bitline column by enabling respective wordline rows coupled to the subset of bitcells.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

In accordance with implementations of the subject matter of this disclosure, measures for prevention of reverse engineering of the physical unclonable function bit values outputted from an entropy source in a semiconductor device are provided. The semiconductor device may be a processor, a system on a chip, or a semiconductor memory. Although the entropy source is not a memory, the entropy source may have a plurality of bitcells arranged in a plurality of bitline columns and in a plurality of wordline rows, which is similar to a memory architecture. In a read operation, an intrinsic property of a bitcell is determined and outputted from the entropy source as a physical unclonable function bit value having either a logic 0 or a logic 1, where the intrinsic property of each bitcell is random because of semiconductor fabrication process variations, is unique for each semiconductor device, and is stable over time. For example, the intrinsic property may be related to how the bitcell discharges one node (for example, bitline) relative to another node (for example, bitline complement). That is, the physical unclonable function bit values are outputted with a logic 0 or a logic 1 from the entropy source based on the intrinsic properties of the plurality of bitcells.

The measures utilize a failure mechanism known as time dependent dielectric breakdown (TDDB). Under the stress of an electric field of an applied voltage, a dielectric breaks down and becomes conductive after a time period. If the stress is sufficiently high, the dielectric becomes damaged and unusable. A high applied voltage that is higher than an operating voltage of the dielectric triggers the dielectric to break down and to become conductive immediately. A low applied voltage that is less than the operating voltage of the dielectric causes the dielectric to break down after a longer time period, such as after many years. In a transistor or other device, the transformation of a portion of a dielectric from a nonconductive state to a conductive state is referred to as TDDB.

As noted above, the physical unclonable function bit values are simply outputted from the entropy source without first storing, programming, or writing the physical unclonable function bit values in the entropy source. As noted above, in a read operation, an intrinsic property of a bitcell is determined and outputted from the entropy source as a physical unclonable function bit value having either a logic 0 or a logic 1, where the intrinsic property of each bitcell is random because of semiconductor fabrication process variations, is unique for each semiconductor device, and is stable over time. For example, the intrinsic property may be related to how the bitcell discharges one node (for example, bitline) relative to another node (for example, bitline complement). That is, the physical unclonable function bit values are outputted with a logic 0 or a logic 1 from the entropy source based on the intrinsic properties of the bitcells. Accordingly, the bitcells are not suitable for an erase or delete operation to prevent the physical unclonable function bit values from being reconstructed from the entropy source.

If a security protocol of a semiconductor device uses a unique device secret generated from the physical unclonable function bit values, there may be situations, such as a security attack, an end-of-life cycle, an enrollment or instantiation designation, or a security protocol change, where it may be desired to permanently make unavailable the physical unclonable function bit values and to prevent reverse engineering of the physical unclonable function bit values from the entropy source, ensuring that the security of the semiconductor device is preserved. Access to data of the semiconductor device requires successful execution of the security protocol that uses the unique device secret generated from the physical unclonable function bit values. If the physical unclonable function bit values are not available, the unique device secret cannot be generated, preventing successful execution of the security protocol and denying access to data of the semiconductor device. Accordingly, the entropy source may be subjected to unauthorized analysis and examination to reconstruct the physical unclonable function bit values to gain unauthorized access to the semiconductor device.

In accordance with a first implementation of the subject matter of this disclosure, at least a portion of the bitcells of the entropy source are selectively damaged. A damage-inducing voltage to induce TDDB in the bitcells is applied via wordline line rows connected to the bitcells in response to an initiate damage signal, where the damage-inducing voltage is higher than an operating voltage of the entropy source and the bitcells.

In accordance with a second implementation of the subject matter of this disclosure, damage-inducing circuitry is coupled to a bitline column to damage a bitcell read functionality of the bitline column by preventing sense amplifier circuitry of the bitline column to read the bitcells of the bitline column and by altering the intrinsic properties of the bitcells of the bitline column. The damage-inducing voltage to induce TDDB in the damage-inducing circuitry is applied in a per bitline column basis in response to the initiate damage signal.

The first and second implementations of the subject matter of this disclosure are low power and can be performed rapidly in response to the initiate damage signal. By damaging a portion of the bitcells in the entropy source or altering the intrinsic properties of a portion of the bitcells in the entropy source, the original intrinsic properties of the damaged or altered bitcells cannot be determined via the unauthorized analysis and examination of the entropy source. The original intrinsic properties of the damaged or altered bitcells are required to reconstruct a sequence of physical unclonable function bit values outputted from the entropy source. In accordance with the first and second implementations of the subject matter of this disclosure, the number of the bitcells in the entropy source that are damaged or altered is sufficient to render mathematically highly improbable the task of reconstructing a sequence of physical unclonable function bit values outputted from the entropy source. Consequently, it is practically impossible to reverse engineer the sequence of physical unclonable function bit values outputted from the entropy source and to recover the unique device secret to gain unauthorized access to the semiconductor device.

The subject matter of this disclosure will be better understood by reference to FIGS. 1-7.

As discussed above, a semiconductor device may be configured to implement a security protocol. The semiconductor device may be a processor, a system on a chip, or a semiconductor memory. Further, the semiconductor device may include an entropy source. The entropy source may include a plurality of bitcells arranged in a plurality of bitline columns and in a plurality of wordline rows. In a read operation, an intrinsic property of a bitcell is determined and outputted from the entropy source as a physical unclonable function bit value having either a logic 0 or a logic 1, where the intrinsic property of each bitcell is random because of semiconductor fabrication process variations, is unique for each semiconductor device, and is stable over time. For example, the intrinsic property may be related to how the bitcell discharges one node (for example, bitline) relative to another node (for example, bitline complement). That is, the physical unclonable function bit values are outputted with a logic 0 or a logic 1 from the entropy source based on the intrinsic properties of the plurality of bitcells. The entropy source may be operable to output a sequence of physical unclonable function bit values based on the intrinsic properties of the bitcells to generate a unique device secret for the security protocol.

Figure 1:
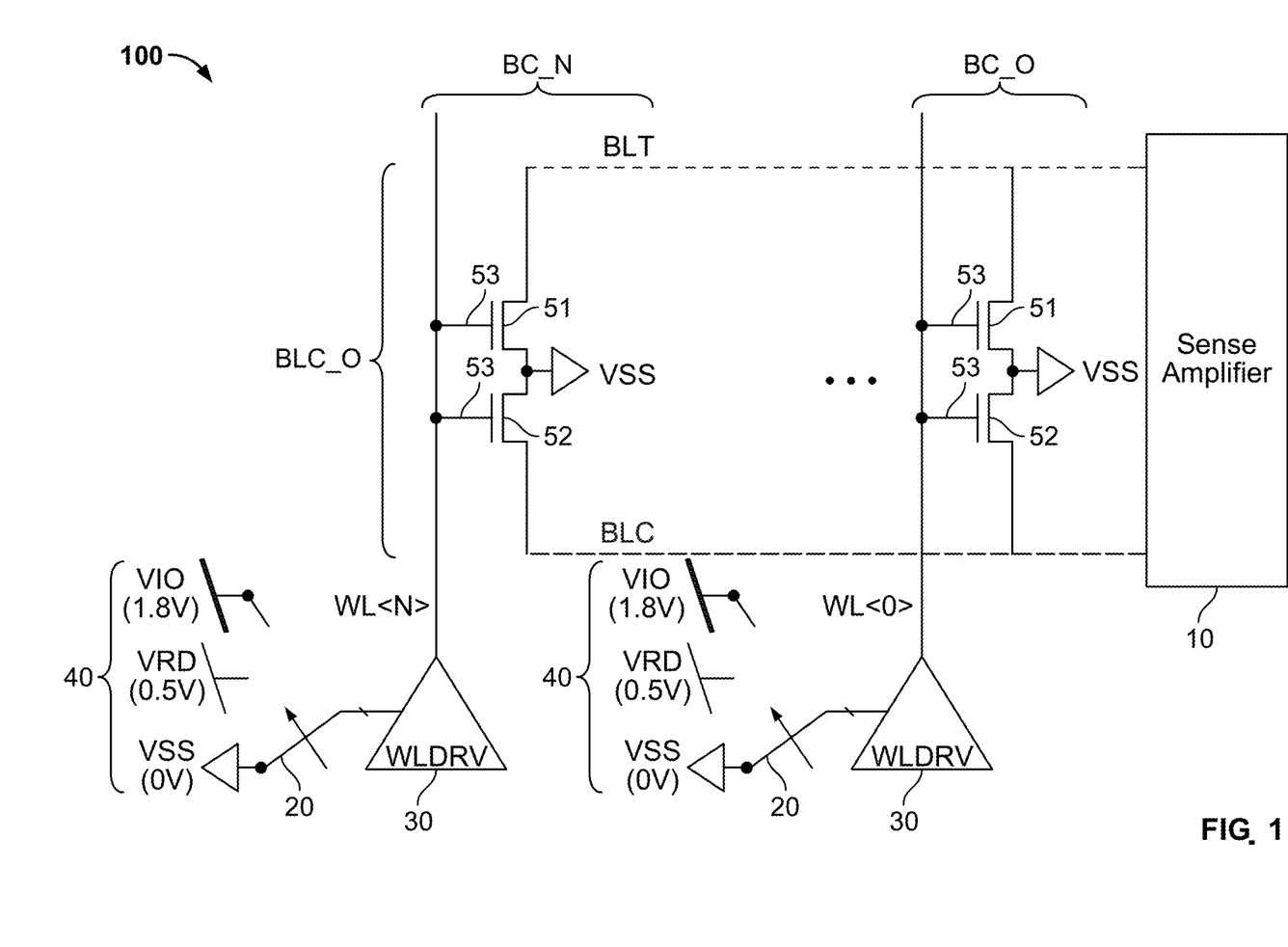
FIGS. 1-3 illustrate schematic representations of a portion of a first entropy source configured to prevent reverse engineering of physical unclonable function bit values outputted from the first entropy source in accordance with a first implementation of the subject matter of this disclosure.
Figure 2:
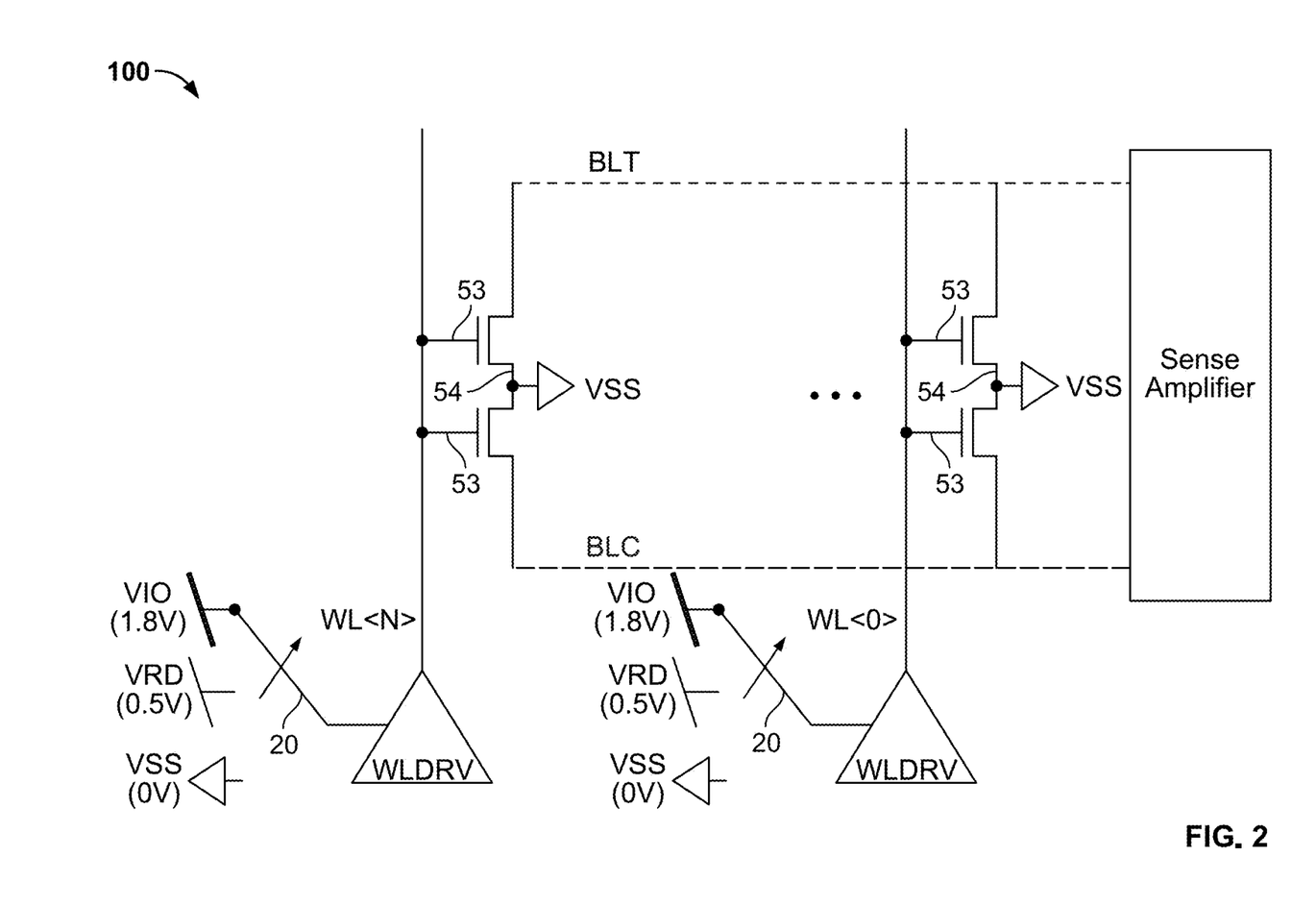
Figure 3:
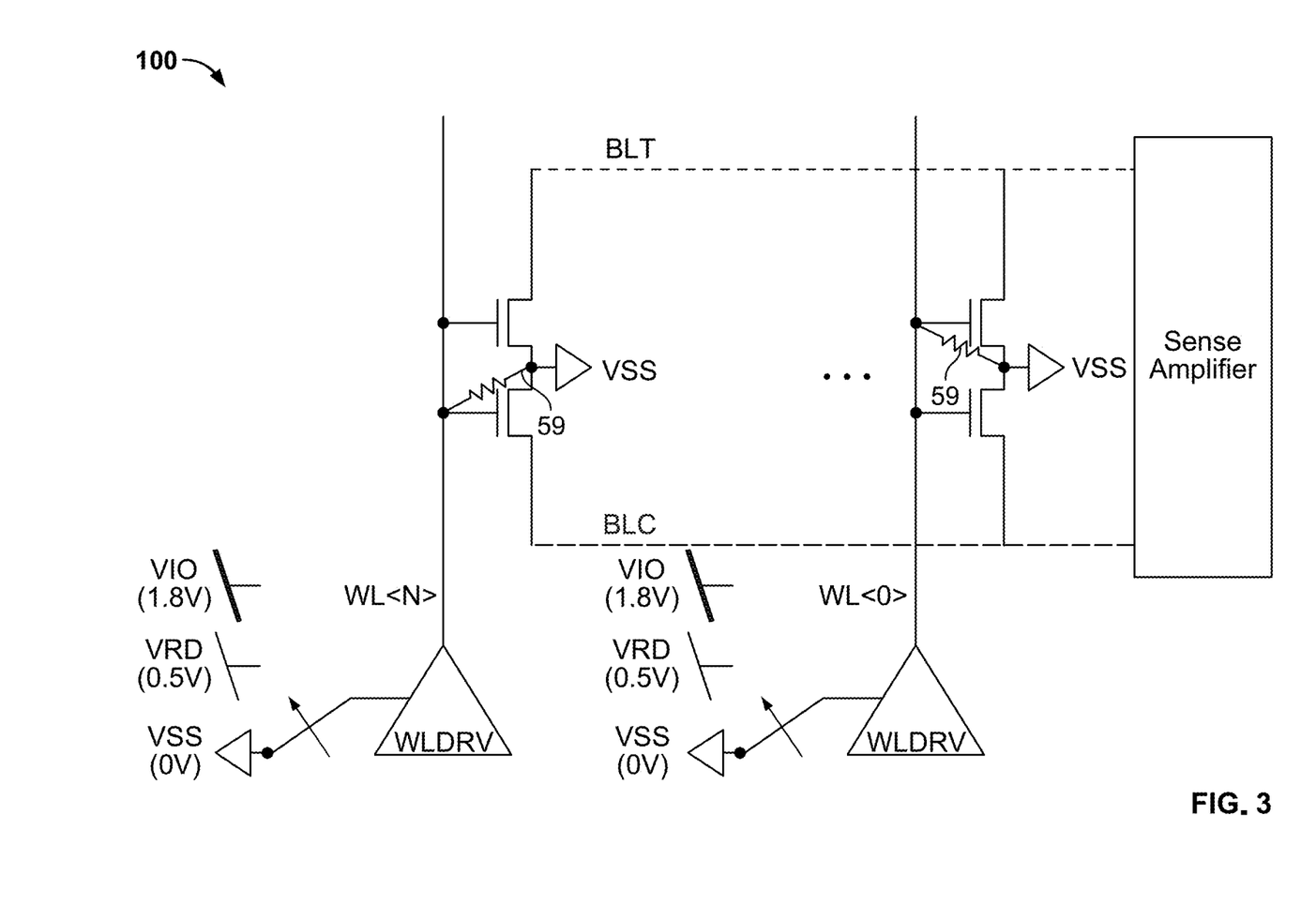

FIGS. 1-3 illustrate schematic representations of a portion of a first entropy source 100 configured to prevent reverse engineering of physical unclonable function bit values outputted from the first entropy source 100 in accordance with a first implementation of the subject matter of this disclosure.

Focusing on FIG. 1, the first entropy source 100 may include a bitline column BLC_0 and a plurality of wordline rows WL<0>-WL<N>. The bitline column BLC_0 includes a plurality of bitcells BC_0-BC_N and sense amplifier circuitry 10 operable to read bitcells BC_0-BC_N, where each of the bitcells BC_0-BC_N is coupled to a respective one of wordline rows WL<0>-WL<N>. Each of the wordline rows WL<0>-WL<N> includes a switch 20, a wordline driver 30, and a plurality of selectable voltages 40. The plurality of selectable voltages 40 includes VSS, a read voltage VRD, and a damage-inducing voltage VIO, in an implementation. The voltage values shown for VSS, the read voltage VRD, and the damage-inducing voltage VIO are examples and are not intended to be limiting. The switch 20 is operable to select from the selectable voltages 40 to apply to the bitcells BC_0-BC_N coupled to the wordline rows WL<0>-WL<N>.

The damage-inducing voltage VIO is higher than an operating voltage of the bitcells BC_0-BC_N and the first entropy source 100. Further, the damage-inducing voltage VIO is configured to induce TDDB in the bitcells BC_0-BC_N. Each of bitcells BC_0-BC_N includes a differential transistor pair coupled between bitline true BLT and bitline complement BLC. The differential transistor pair includes a first transistor 51 operable to sink current from bitline true BLT during a read operation and a second transistor 52 operable to sink current from bitline complement BLC during the read operation. Moreover, gate terminals 53 of the first transistor 51 and the second transistor 52 are coupled to the wordline rows WL<0>-WL<N>.

The first entropy source 100 is operable to damage at least a portion of the plurality of bitcells BC_0-BC_N on a per wordline row basis to prevent reverse engineering the sequence of physical unclonable function bit values outputted from the first entropy source 100, as depicted in FIGS. 2-3 in accordance with the first implementation of the subject matter of this disclosure.

Referencing FIG. 2, switches 20 select the damage-inducing voltage VIO in response to an initiate damage signal (not shown). The gate terminals 53 of the first transistor 51 and the second transistor 52 receive the damage-inducing voltage VIO. Meanwhile, terminals 54 of the first transistor 51 and the second transistor 52 are coupled to VSS. Consequently, the voltage difference between the gate terminals 53 and terminals 54 is sufficient to induce TDDB to create a conductive path for a leakage current in each of bitcells BC_0-BC_N to cause each of bitcells BC_0-BC_N to be in a damaged state. As a result, the original intrinsic properties of the damaged bitcells BC_0-BC_N are no longer available for reverse engineering efforts to obtain the sequence of physical unclonable function bit values outputted from the first entropy source 100.

Now referencing FIG. 3, the conductive path for the leakage current is indicated by a resistive element 59. Further, the switches 20 now select VSS after applying the damage-inducing voltage VIO for a particular time period in accordance with the first implementation of the subject matter of this disclosure.

Returning to FIG. 2, factors, such as temperature and semiconductor fabrication process variations, may prevent some of the bitcells BC_0-BC_N, some of the first transistors 51, or some of the second transistors 52 from suffering damage. However, in an implementation, a sufficient number of the bitcells BC_0-BC_N are damaged to make it practically impossible to reverse engineer the sequence of physical unclonable function bit values outputted from the first entropy source 100 after application of the damage-inducing voltage VIO.

Since application of the damage-inducing voltage VIO is a low power task because no current is required, the damage-inducing voltage VIO may be applied to the plurality of wordline rows WL<0>-WL<N> in parallel or may be applied to a subset of the wordline rows WL<0>-WL<N> in response to the initiate damage signal (not shown). That is, the damage-inducing voltage VIO may be selectively applied to the wordline rows WL<0>-WL<N> in accordance with the first implementation of the subject matter of this disclosure.

Figure 4:
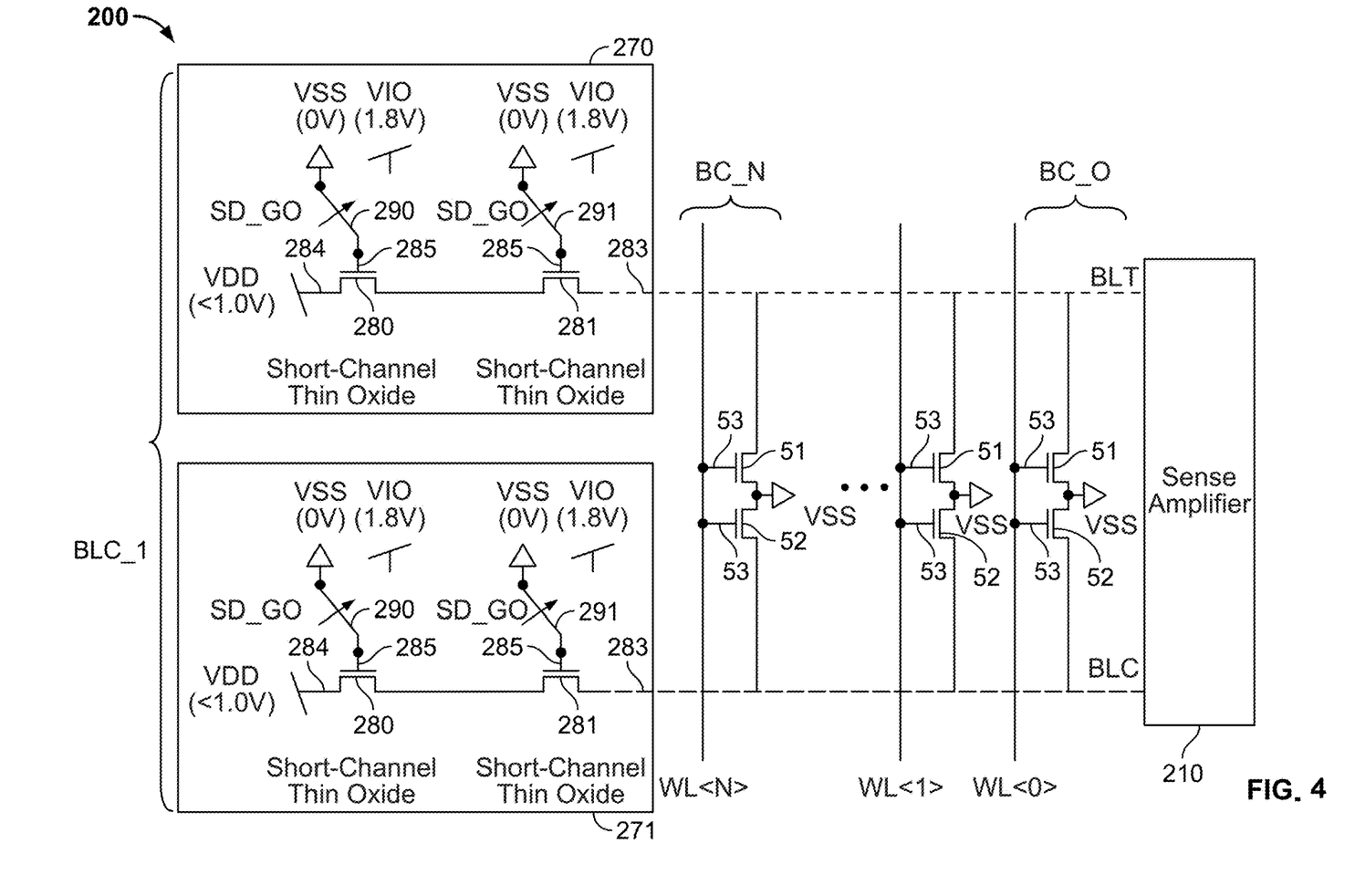
FIGS. 4-6 illustrate schematic representations of a portion of a second entropy source configured to prevent reverse engineering of physical unclonable function bit values outputted from the second entropy source in accordance with a second implementation of the subject matter of this disclosure.
Figure 5:
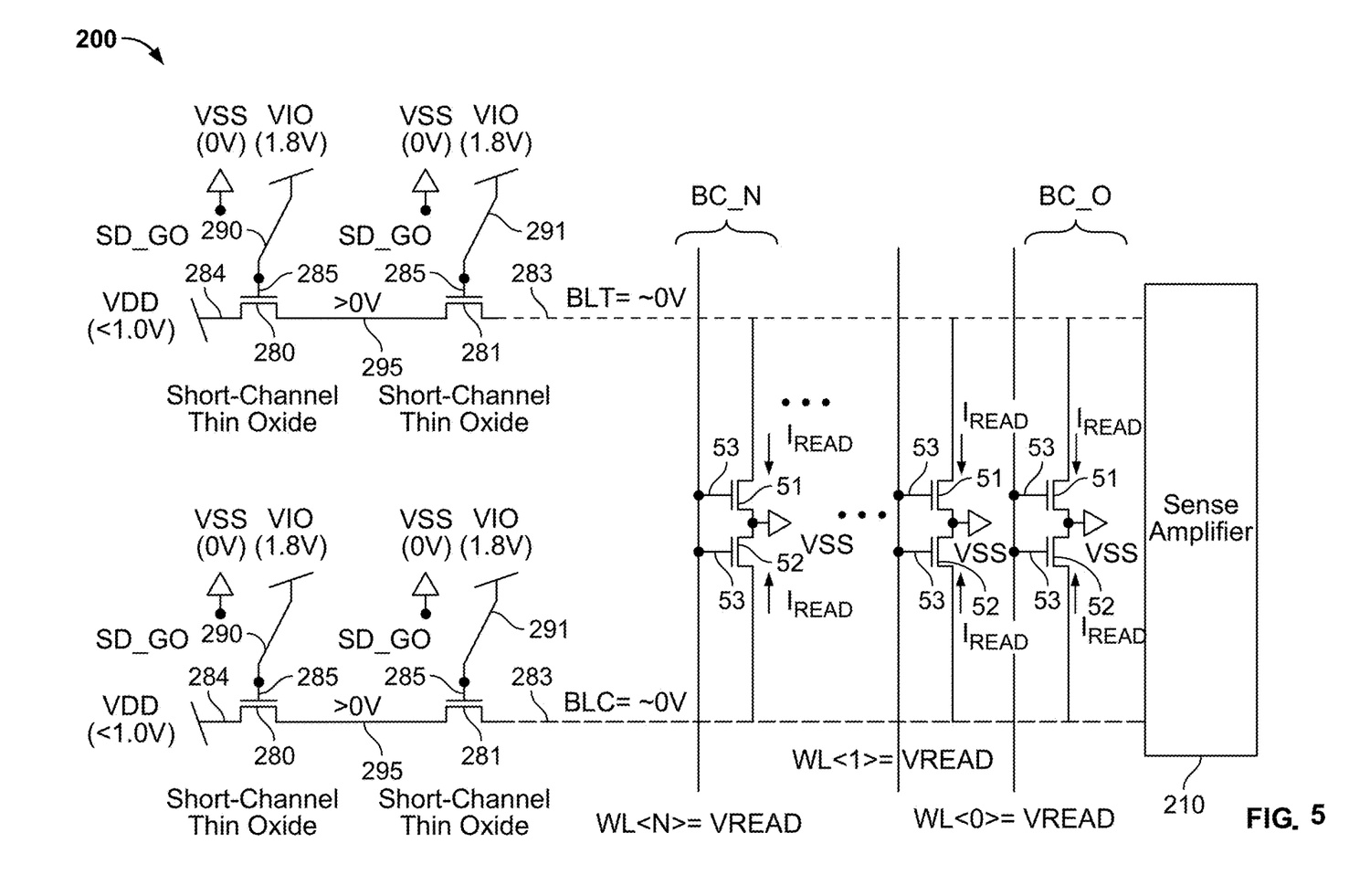
Figure 6:
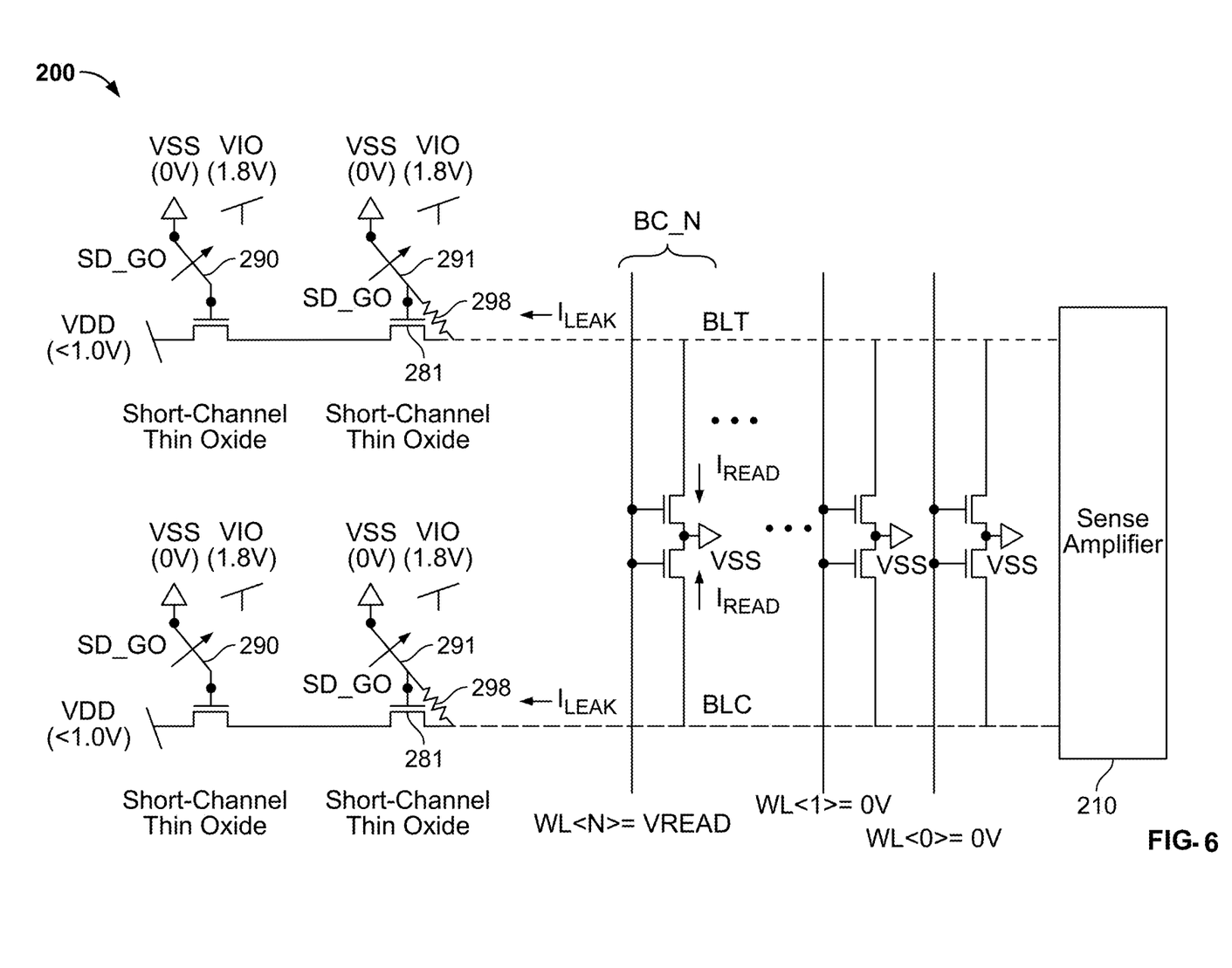

FIGS. 4-6 illustrate schematic representations of a portion of a second entropy source 200 configured to prevent reverse engineering of physical unclonable function bit values outputted from the second entropy source in accordance with a second implementation of the subject matter of this disclosure.

Focusing on FIG. 4, the second entropy source 200 may include a bitline column BLC_1 and a plurality of wordline rows WL<0>-WL<N>. The bitline column BLC_1 includes a plurality of bitcells BC_0-BC_N and sense amplifier circuitry 210 operable to read bitcells BC_0-BC_N, where each of the bitcells BC_0-BC_N is coupled to a respective one of wordline rows WL<0>-WL<N>. Each of bitcells BC_0-BC_N includes a differential transistor pair coupled between bitline true BLT and bitline complement BLC. The differential transistor pair includes a first transistor 51 operable to sink current from bitline true BLT during a read operation and a second transistor 52 operable to sink current from bitline complement BLC during the read operation. Moreover, gate terminals 53 of the first transistor 51 and the second transistor 52 are coupled to the wordline rows WL<0>-WL<N>.

The bitline column BLC_1 further includes first damage-inducing circuitry 270 coupled to the bitline true BLT, second damage-inducing circuitry 271 coupled to the bitline complement BLC in accordance with the second implementation of the subject matter of this disclosure. Each of the first damage-inducing circuitry 270 and the second damage-inducing circuitry 271 includes a first transistor 280 and a second transistor 281 arranged in series, a first switch 290 operable to select from a plurality of selectable voltages to apply to a gate terminal 285 of the first transistor 280, and a second switch 291 operable to select from the plurality of selectable voltages to apply to a gate terminal 285 of the second transistor 281. The plurality of selectable voltages includes VSS and a damage-inducing voltage VIO that is higher than an operating voltage of the second transistor 281 and the second entropy source 200, in an implementation. Also, the damage-inducing voltage VIO is configured to induce TDDB in the second transistor 281. Further, a terminal 283 of the second transistor 281 is coupled to one of the bitline true BLT or the bitline complement BLC. Additionally, a terminal 284 of the first transistor 280 is coupled to VDD. The voltage values shown for VSS, the damage-inducing voltage VIO, and VDD are examples and are not intended to be limiting.

Furthermore, the first transistor 280 and the second transistor 281 may be configured to have a minimum channel size and a minimum dielectric thickness according to the semiconductor fabrication process.

The first switch 290 and the second switch 291 are operable to select the damage-inducing voltage VIO in response to an initiate damage signal SG GO and are operable to apply the damage-inducing voltage VIO for a particular time period.

The second entropy source 200 is operable to damage at least a portion of a bitcell read functionality on a per bitline column basis (for example, bitline column BLC_1) to prevent reverse engineering the sequence of physical unclonable function bit values outputted from the second entropy source 200, as depicted in FIGS. 5-6 in accordance with the second implementation of the subject matter of this disclosure.

Referencing FIG. 5, the bitline true BLT and the bitline complement BLC of the bitline column BLC_1 are discharged by application of read voltage VREAD to the wordline rows WL<0>-WL<N> coupled to the bitcells BC_0-BC_N of the bitline column BLC_1. As explained above, the first transistor 51 is operable to sink current $I_{READ}$ from bitline true BLT during the read operation and the second transistor 52 operable to sink current $I_{READ}$ from bitline complement BLC during the read operation. Consequently, the voltages values of the bitline true BLT and the bitline complement BLC are discharged to a voltage level that approximates 0V.

Next, the first switch 290 and the second switch 291 select the damage-inducing voltage VIO to apply to the gate terminals 285 of the first transistor 280 and the second transistor 281 in response to the initiate damage signal SG GO transitioning from state 0 to state 1. Although the TDDB could potentially occur in either the first transistor 280 or the second transistor 281, it is desired for the TDDB to occur in the second transistor 281. The TDDB occurs in the second transistor 281 but not in the first transistor 280 because node 295 is greater than 0V while the bitline true BLT and the bitline complement BLC are discharged to approximately 0V. As noted above, the terminal 283 of the second transistor 281 is coupled to one of the bitline true BLT or the bitline complement BLC.

Consequently, the voltage difference between the gate terminal 285 and the terminal 283 of the second transistor 281 is sufficient to induce TDDB to create a conductive path for a leakage current in the second transistor 281 of the first damage-inducing circuitry 270 and the second damage-inducing circuitry 271 to cause the second transistor 281 to be in a damaged state. The conductive path for the leakage current damages a bitcell read functionality of the bitline column BLC_1 by preventing the sense amplifier circuitry 210 from reading the bitcells BC_0-BC_N of the bitline column BLC_1 and by altering the intrinsic properties of the bitcells BC_0-BC_N. As a result, the original intrinsic properties of the altered bitcells BC_0-BC_N are no longer available for reverse engineering efforts to obtain the sequence of physical unclonable function bit values outputted from the second entropy source 200.

Now referencing FIG. 6, the conductive path for the leakage current $I_{LEAK}$ is indicated by a resistive element 298. Further, the first switch 290 and the second switch 291 now select VSS after applying the damage-inducing voltage VIO for a particular time period. Also, a read operation of the bitcell BC_N is illustrated to show the leakage current $I_{LEAK}$ alters the voltage characteristics of the bitline true BLT and the bitline complement BLC expected by the sense amplifier circuitry 210 to perform the read operation in accordance with the second implementation of the subject matter of this disclosure.

Returning to FIG. 5, factors, such as temperature and semiconductor fabrication process variations, may prevent one of the second transistors 281 from suffering damage in the bitline column BLC_1. However, a sufficient number of the second transistors 281 are damaged across multiple bitline columns to make it practically impossible to reverse engineer the sequence of physical unclonable function bit values outputted from the second entropy source 200 after application of the damage-inducing voltage VIO in accordance with the second implementation of the subject matter of this disclosure.

Since application of the damage-inducing voltage VIO is a low power task because no current is required, the damage-inducing voltage VIO may be applied to one or both of the first damage-inducing circuitry 270 and the second damage-inducing circuitry 271 in response to the initiate damage signal SG GO. Further, the damage-inducing voltage VIO may be selectively applied to other bitline columns of the second entropy source 200 in a sequential manner.

It is noted that the transistors shown in FIGS. 1-6 may be n-type metal-oxide semiconductor field-effect transistors (NMOSFETS or NFETS) in an implementation.

Figure 7:
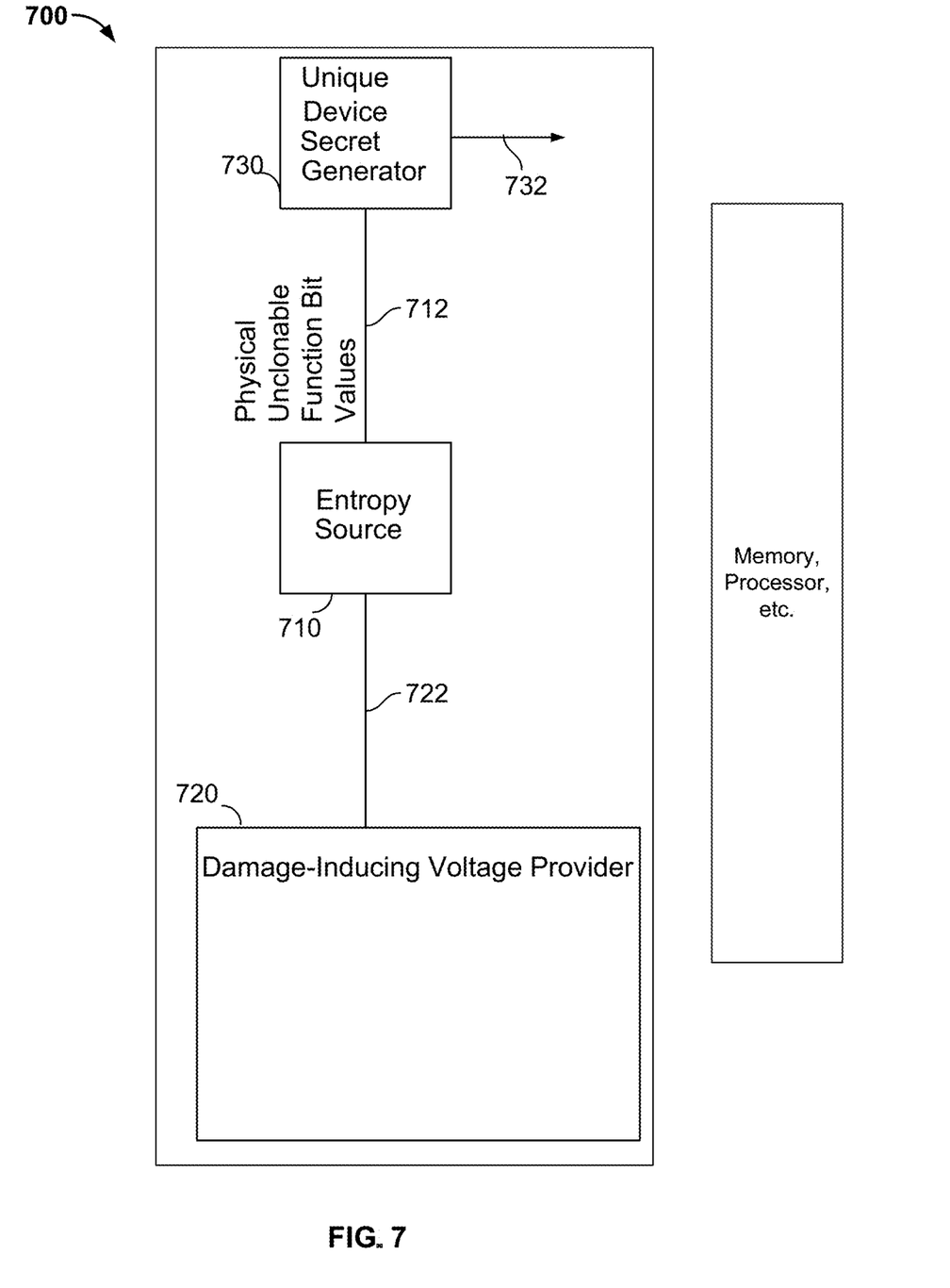
FIG. 7 is a block diagram of a semiconductor device in accordance with implementations of the subject matter of this disclosure to prevent reverse engineering of physical unclonable function bit values outputted from an entropy source.

FIG. 7 is a block diagram of a semiconductor device 700 in accordance with implementations of the subject matter of this disclosure to prevent reverse engineering of physical unclonable function bit values outputted from an entropy source. The semiconductor device 700 may be a processor, a system on a chip, or a semiconductor memory.

The semiconductor device 700 may include an entropy source 710, a damage-inducing voltage provider 720, and a unique device secret generator 730.

As discussed above, the entropy source 710 includes a plurality of bitcells. The entropy source 710 is operable to output a sequence of physical unclonable function bit values 712 based on intrinsic properties of the plurality of bitcells.

Further, the entropy source 710 is configured to receive a damage-inducing voltage 722 from the damage-inducing voltage provider 720, which may obtain voltage from an internal source or an external source. The damage-inducing voltage 722 may be used to damage or alter at least a portion of the bitcells of the entropy source 710 to prevent reverse engineering of the sequence of physical unclonable function bit values 712, as described above.

The unique device secret generator 730 is operable to receive the sequence of physical unclonable function bit values 712. Further, the unique device secret generator 730 is configured to generate a unique device secret 732 for a security protocol of the semiconductor device 700 based on the received sequence of physical unclonable function bit values 712.

Thus, it is seen that preventing reverse engineering of physical unclonable function bit values outputted from the entropy source has been provided.

It is further noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A semiconductor device configured to implement a security protocol, the semiconductor device comprising:
   an entropy source including a plurality of bitcells, wherein the entropy source is configured to:
      output a sequence of physical unclonable function bit values based on intrinsic properties of the plurality of bitcells to generate a unique device secret for the security protocol, and
      selectively damage at least a portion of the plurality of bitcells to prevent reverse engineering the sequence of physical unclonable function bit values.

2. The semiconductor device of claim 1, wherein the plurality of bitcells are arranged in a plurality of bitline columns and in a plurality of wordline rows, wherein each of the plurality of wordline rows includes a switch operable to select from a plurality of voltages to apply to respective bitcells of the respective wordline row, and wherein the plurality of voltages includes a damage-inducing voltage that is higher than an operating voltage of the respective bitcells.

3. The semiconductor device of claim 2, wherein the switch is operable to select the damage-inducing voltage in response to an initiate damage signal.

4. The semiconductor device of claim 3, wherein the damage-inducing voltage is applied to gate terminals of two or more respective bitcells to induce time delayed dielectric breakdown between the gate terminals and other terminals of the two or more respective bitcells to create a conductive path for a leakage current in the two or more respective bitcells to cause the two or more respective bitcells to be in a damaged state.

5. The semiconductor device of claim 4, wherein the damage-inducing voltage is applied to a subset of the plurality of wordline rows in response to the initiate damage signal.

6. The semiconductor device of claim 4, wherein the damage-inducing voltage is applied to the plurality of wordline rows in parallel in response to the initiate damage signal.

7. The semiconductor device of claim 1, wherein the semiconductor device is one of a processor, a system on a chip, or a semiconductor memory.

8. A semiconductor device configured to implement a security protocol, the semiconductor device comprising:
an entropy source including a plurality of bitcells, wherein the entropy source is configured to:
output a sequence of physical unclonable function bit values based on intrinsic properties of the plurality of bitcells to generate a unique device secret for the security protocol, and
selectively damage at least a portion of a bitcell read functionality to alter the intrinsic properties of at least a portion of the bitcells to prevent reverse engineering the sequence of physical unclonable function bit values.

9. The semiconductor device of claim 8, wherein the plurality of bitcells are arranged in a plurality of bitline columns and in a plurality of wordline rows, wherein each of the plurality of bitline columns includes a bitline, a bitline complement, first damage-inducing circuitry coupled to the bitline, second damage-inducing circuitry coupled to the bitline complement, sense amplifier circuitry, and respective bitcells, wherein each of the first damage-inducing circuitry and the second damage-inducing circuitry includes a first transistor and a second transistor arranged in series, a first switch operable to select from a plurality of voltages to apply to a gate terminal of the first transistor, and a second switch operable to select from the plurality of voltages to apply to a gate terminal of the second transistor, wherein a terminal of the second transistor is coupled to one of the bitline or the bitline complement, and wherein the plurality of voltages includes a damage-inducing voltage that is higher than an operating voltage of the second transistor.

10. The semiconductor device of claim 9, wherein the first and second switches are operable to select the damage-inducing voltage in response to an initiate damage signal.

11. The semiconductor device of claim 10, wherein the damage-inducing voltage is applied in response to the initiate damage signal to induce time delayed dielectric breakdown between the gate terminal of the second transistor and the terminal of the second transistor to create a conductive path for a leakage current in the second transistor to cause the second transistor to be in a damaged state, wherein the conductive path for the leakage current damages a respective bitcell read functionality of the respective bitline column by preventing the sense amplifier circuitry to read the respective bitcells of the respective bitline column and by altering the intrinsic properties of the respective bitcells.

12. The semiconductor device of claim 11, wherein before the damage-inducing voltage is applied in the respective bitline column, the bitline and the bitline complement of the respective bitline column are discharged by enabling respective wordline rows coupled to the respective bitcells of the respective bitline column.

13. The semiconductor device of claim 11, wherein the damage-inducing voltage is applied to one of the first damage-inducing circuitry or the second damage-inducing circuitry in response to the initiate damage signal.

14. The semiconductor device of claim 11, wherein the damage-inducing voltage is applied to both the first damage-inducing circuitry and the second damage-inducing circuitry in response to the initiate damage signal.

15. The semiconductor device of claim 8, wherein the semiconductor device is one of a processor, a system on a chip, or a semiconductor memory.

16. A method of preventing a reverse engineering of a sequence of physical unclonable function bit values outputted from an entropy source based on intrinsic properties of a plurality of bitcells in a semiconductor device configured to implement a security protocol that uses a unique device secret generated from the sequence of physical unclonable function bit values, the method comprising:
configuring the entropy source to receive a damage-inducing voltage that is higher than an operating voltage of the entropy source; and
selectively applying the damage-inducing voltage to damage one of at least a portion of the plurality of bitcells or at least a portion of a bitcell read functionality to alter the intrinsic properties of at least a subset of the plurality of bitcells.

17. The method of claim 16, wherein the semiconductor device is one of a processor, a system on a chip, or a semiconductor memory, wherein selectively applying the damage-inducing voltage comprises selectively applying the damage-inducing voltage in response to an initiate damage signal.

18. The method of claim 17, wherein selectively applying the damage-inducing voltage comprises inducing time delayed dielectric breakdown to create a conductive path for a leakage current in the portion of bitcells to cause the portion of bitcells to be in a damaged state.

19. The method of claim 18, wherein selectively applying the damage-inducing voltage comprises applying the damage-inducing voltage to a subset of a plurality of wordline rows of the entropy source in response to the initiate damage signal.

20. The method of claim 18, wherein selectively applying the damage-inducing voltage comprises applying the damage-inducing voltage to a plurality of wordline rows of the entropy source in parallel in response to the initiate damage signal.

21. The method of claim 17, wherein selectively applying the damage-inducing voltage comprises inducing, in response to the initiate damage signal, time delayed dielectric breakdown in a damage-inducing circuitry of a bitline column of the entropy source to create a conductive path for a leakage current that damages the bitcell read functionality of the bitline column by preventing sense amplifier circuitry of the bitline column to read the subset of bitcells and by altering the intrinsic properties of the subset of bitcells.

22. The method of claim 21, wherein selectively applying the damage-inducing voltage comprises, before the damage-inducing voltage is applied in the bitline column, discharging a bitline and a bitline complement of the bitline column by enabling respective wordline rows coupled to the subset of bitcells.

* * * * *